June 20, 1967

G. B. GUENTHER 3,326,520

RESILIENT NEEDLE VALVE ELEMENT

Filed March 25, 1964

INVENTOR.
Gordon B. Guenther
BY
Oberlin, Maky & Donnelly
attorneys 3,326,520
RESILIENT NEEDLE VALVE ELEMENT
Gordon B. Guenther, Lyndhurst, Ohio, assignor to Industrial Electronic Rubber Co., Twinsburg, Ohio, a corporation of Ohio
Filed Mar. 25, 1964, Ser. No. 354,545
1 Claim. (Cl. 251—358)

This invention relates generally as indicated to a needle valve construction and, more particularly, to a valve especially suitable for use in connection with carburetors of conventional internal combustion engines.

In this last type of use, it is becoming increasingly common to employ a needle valve form in which a resilient tip is molded on the end of a metal body, and it has been customary to provide a socket in such end of the metal body to receive a portion of the molding composition for anchoring purposes. The resulting needle valve thus comprises an appreciable mass of resilient material subject to swelling upon exposure to gasoline and other fuels, with the result that the production of these valves has called for the employment of special and relatively expensive molding compositions, the most common example being a heat and fluid resistant fluoro-elastomer supplied by E. I. du Pont de Nemours and Co. under the name "Viton." The tip form is usually conical for the noted carburetor valve use.

It is an object of this invention to provide an improved tip formation for such a valve, that is, generally understood as comprising a rigid, usually metallic, body having an end at which resilient material is carried for the desired sealing function.

An additional object of the invention is to provide such a valve with a greatly reduced mass of resilient material, such as rubber, as compared to comparable valves now available for equivalent use.

Yet another object of the invention is to provide a valve having a controlled resiliency determined by its method of manufacture and particularly the relative amount and nature of the disposition of the resilient material employed.

A further object is to provide a valve having a rubber tip which does not require the use of expensive molding compositions, such as the aforenoted fluoroelastomer, in order to provide a successful operating valve with respect to possible swelling and the like.

Another object of the invention is to provide such a valve having a sharper cut-off characteristic and reduced tendency to cork or bind.

An additional object is the provision of a resilient tip needle valve element in which possible distortion in the molding step is substantially eliminated, with close and reliable control of the resilient sealing portion of the valve element in respect both of geometry and degree of resiliency afforded.

It is also an object of the invention to provide such a valve in which the formation of flash in the molding operations is prevented.

Another object of the invention is to provide such a valve which, for practical purposes, eliminates completely concavity in the resilient sealing portion as it has been experienced in conventional valves on the same order by reason of shrinkage of the material in the molding operation.

The invention comprises, briefly, providing a valve in which the sealing or operating section thereof, such as the tip of the carburetor needle valve discussed, comprises both rigid and resilient parts, with the former backing the latter in the tip as such, i.e., distinct from the main body portion of the valve. In this new tip formation, the rigid part constitutes an interior preform of approximately the same configuration of the desired resilient part, exposed at the exterior and molded about such inner preform section. In the production of this tip, the rigid preform is forcibly inserted and deformed in the mold cavity in such manner as to center the same therein for closely controlled application of the resilient material thereabout without flashing requiring a separate finishing operation.

Other objects of the invention will become apparent as the following description proceeds.

To the accomplishments of the foregoing and related ends, the invention, then, comprises the features hereinafter fully described and particularly pointed out in the claim, the following description and the annexed drawing setting forth in detail an illustrative embodiment of the invention, this being indicative, however, of but one of the various ways in which the principle of the invention may be employed.

Figure 1:
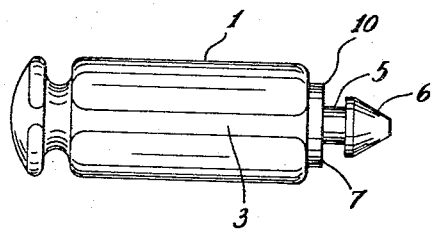
FIG. 1 is an elevation of a rigid body element used for producing a carburetor rubber tipped needle valve in accordance with the present invention.

With more particular reference now to the drawings, the component shown in FIG. 1 will be recognized as a main body for a carburetor needle valve and the like, designated generally by reference numeral 1, with this body being elongate and fluted as shown at 3 or of irregular transverse section adequate to provide desired flow of the fluid being metered along such body when housed in a passage for such flow. In such a valve, this element will be ordinarily made of metal, preferably brass or stainless steel, and the particular illustrated component is distinguished by a metal tip formation, designated generally by reference numeral 6 either integral with or attached at the end of the main body as may be found most expedient.

This metal or rigid end tip formation 6 projects from a cylindrical extension 7 of relatively short axial length and includes a reduced neck 5 terminating in the tip formation 6 of general right frusto-conical shape. In this embodiment, it is desired to provide a rubber tip indicated generally at 8 at the end of the needle body of conical shape in its active portion. The metal tip formation 6 is of corresponding shape but smaller in size by a pre-determined degree, with this determination being discussed more fully below.

Figure 3:
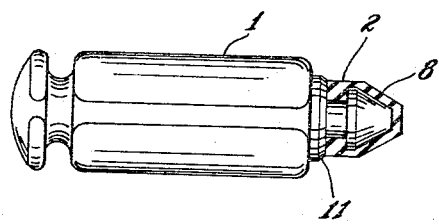
FIG. 3 is a similar elevation partly in section of the completed valve after removal from the mold.
Figure 4:
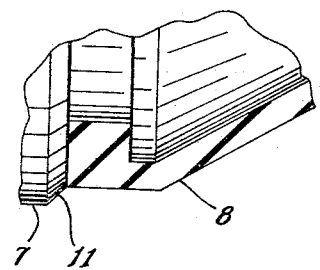
FIG. 4 is a fragmentary view of a portion of the FIG. 3 valve on a greatly enlarged scale.
Figure 2:
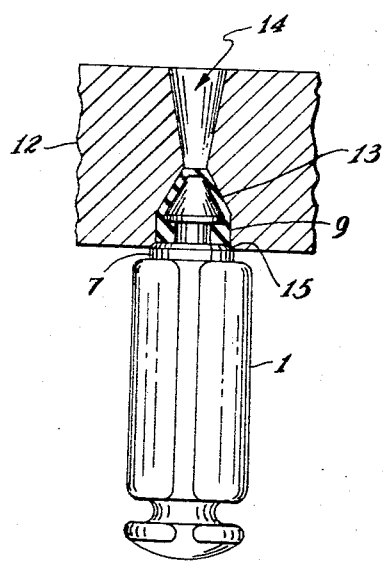
FIG. 2 shows the finished valve with the tip in section in association with a simplified mold, in section, just prior to removal of the valve therefrom.

As indicated in FIGS. 2 and 4, a body of resilient material 8 is molded about the metal tip preform 6 in a mold plate 12 having an opening defined by a conical outer wall section 15 on the axis of the opening, an inwardly succeeding cylindrical wall 9, and a conical inner wall extension 13 having communication with an injection passage or sprue 14 extending to the opposite side of the mold plate. It will be clear from this illustration that the needle body 1 is appropriately positioned and its end forced into the variably contoured mold cavity to such extent that the originally sharp edge 10 seen in FIG. 1 of the cylindrical portion 7 thereof is swaged within the mold wall section 15 as seen at 11 in FIGS. 3 and 4. This operation causes the body and hence the metal tip preform 6 to become properly centered in the mold cavity for better concentricity, while the interference causing the swaging seals the cavity at the inner mold face. This last sealing is effective to preclude the formation of flash and hence the need for any subsequent finishing of the tip.

The molding composition is of course injected through the sprue 14 and forced to fill the cavity in the remaining space about the rigid tip preform 6. No sprue flash is shown for convenience. In the finished product, this composition forms with suitable curing thereof a body of resilient material 8 of frusto-conical shape surrounding the outermost similarly shaped metal preform 6 with substantially uniform thickness, together with an integral cylindrical extension 2 continuing to the body end portion 7. As a result of the illustrated reduction in diameter of the intermediate neck portion 5 relative both to the tip preform 6 and the body end extension 7, the part of the molded resilient material about this portion 5 is effectively locked in place and anchors the outer resilient envelope on the preform.

The thickness of this resilient material envelope thus molded on the forward portion of the valve element should, for most applications in the automotive field, be within the range of approximately 0.005 and 0.032 inch, with about 0.008 to 0.015 inch being the preferred range. The thickness should be such that the valve tip is sufficiently resilient to not materially affect dirt digestion and to permit conformation around dirt particles on the valve seat with which the valve element is operatively associated. The exact thickness is of course influenced by the particular application of the valve further with respect to the degree of effective hardness desired for sharp cut-off and avoidance of corking, the relationship of the material and the fluid to which it is to be exposed in regard to digestion of the latter, and swelling of the material.

The preferred resilient material for use in this invention is Buna N elastomer which is an inexpensive acrylonitrile-butadiene latex copolymer commercially available under the trade name of "Hycar" of the B. F. Goodrich Company. However, other rubber-like elastomers can also be used, including the aforementioned "Viton," and other gasoline-resistant polymers.

The angle of the crimp at the area of engagement with the resilient material with the base portion of the metallic back-up member can vary, with the preferred angle being approximately 45°, since such angle has been found very effective to seal off the mold cavity and give the maximum amount of centering of the valve insert during the molding operation thereby contributing to the improved concentricity. This crimping or swaging action also accommodates necessarily tolerated variations in the length of the main body 1.

The valve construction of this invention will thus be seen to offer considerable advantages over the prior art designs. A sealing area is provided which is backed up by steel or similar metal, the advantage in this being the sharper cut-off point, i.e., a better seal between the tip and valve seat, due to less resilience and a lesser tendency to cork. The steel back-up design also provides for better concentricity and a seal area which is more nearly a perfect circle, thereby improving the reliability of the valve on the extreme ends of the tolerance.

A considerably smaller amount of resilient material is used minimizing the effect of swelling in the fluids being metered. Since the tolerable swell in a valve is a function of the thickness of the resilient material in the gauge area, a considerably higher percentage of swell can be tolerated in this construction due to the smaller amount of elastomer which is employed, without changing the geometry in the carburetor set, for example, so that the fuel flow would be restricted. In some designs where the resilient coating is extremely thin, a percentage swell as high as 25 percent can be tolerated.

Because of the fact that a higher percentage of swell can be tolerated, resilient materials such as the aforesaid Buna N elastomer can be used which are considerably less expensive than those now commonly employed. Even should the latter be preferred in particular instances, there is a comparative cost savings by virtue of the lesser amount of the material needed in accordance with the invention. In the manufacture of the new valve, the resilient material is preferably further held in place on the preform by an adhesive, such as provided by dipping the preform in liquid cement before the molding step. The material used for the purpose is of course compatible to the particular molding compound and the metal of which the preform is made, with heat setting in the molding operation. Such added adhesive is particularly preferred when the molding compound is Buna N elastomer or an equivalent thereto as assisting in minimizing swelling and life of the material from the metal as a result.

It will be appreciated by workers in the art that the aforesaid and other advantages of the new tip derive essentially from its combination of a metal or rigid preform and a resilient envelope. Such improvements can also be realized with tips or valve elements of operative sections having diverent shapes than the one shown, with the same rigid back-up preferably provided by a preform corresponding in shape to the desired outer configuration for such section as in the herein disclosed embodiments.

Other modes of applying the principle of the invention may be employed, change being made as regards the details described, provided the features stated in any of the following claim, or the equivalent of such, be employed.

I, therefore, particularly point out and distinctly claim as my invention:

A resilient tip needle valve element comprising a rigid elongated body having a circular cylindrical extension on one end, a right frusto-conical tip formation projecting axially from said circular extension and connected thereto by a reduced diameter neck portion, the diameter of the base of said frusto-conical tip formation being less than the diameter of said circular cylindrical extension, and a resilient tip molded about said right frusto-conical tip formation including a conical relatively thin walled envelope portion closely and uniformly covering the conical surface of said conical tip formation and a cylindrical portion extending from said conical envelope portion of said resilient tip to said circular extension of said rigid elongated body filling the reduced diameter neck portion to lock the resilient molded tip in place, the conical envelope portion of said resilient tip thus being of substantially reduced volume and having a uniform rigid backing, the edge of the circular cylindrical extension being formed with a conical surface during the molding operation to center the frusto-conical tip formation in the mold cavity and to close the mold cavity.

References Cited

UNITED STATES PATENTS

| | | | |
|---|---|---|---|
| 1,064,894 | 6/1913 | Frederick | 251—356 |
| 1,826,549 | 10/1931 | Jardine | 29—156.7 |
| 2,493,650 | 1/1950 | Baker et al. | 251—357 X |
| 2,782,801 | 2/1957 | Ludwig | 251—356 X |
| 2,876,982 | 3/1959 | Snider | 251—357 X |
| 2,920,861 | 1/1960 | Hartmann | 251—357 |
| 3,070,116 | 12/1962 | Noland et al. | 251—333 X |
| 3,087,705 | 4/1963 | Hamilton | 251—356 |
| 3,090,108 | 5/1963 | Gifford | 29—156.7 |
| 3,090,596 | 5/1963 | Gifford | 251—333 |
| 3,191,905 | 6/1965 | Brown | 251—360 X |
| 3,236,496 | 2/1966 | Rosenstein et al. | 317—434 X |

FOREIGN PATENTS 478,627 11/1951 Canada.

M. CARY NELSON, *Primary Examiner.*

S. SCOTT, *Examiner.*